United States Patent [19]
Wienss

[11] Patent Number: 5,803,676
[45] Date of Patent: Sep. 8, 1998

[54] METHOD AND TOOL FOR REPAIRING DAMAGED THREADS

[75] Inventor: Dietrich E. Wienss, N32 W22198 Shady La., Pewaukee, Wis. 53072

[73] Assignee: Dietrich E. Wienss, Pewaukee, Wis.

[21] Appl. No.: 618,851

[22] Filed: Mar. 20, 1996

[51] Int. Cl.[6] .................................................. B23G 5/00
[52] U.S. Cl. ........................ 408/1 R; 408/215; 408/238; 408/220; 470/67
[58] Field of Search .................................... 408/1 R, 221, 408/220, 219, 215, 238, 123, 121, 122, 122.5; 470/67, 207, 185; 407/187

[56] References Cited

U.S. PATENT DOCUMENTS

| | | | |
|---|---|---|---|
| 189,719 | 4/1877 | Flower | 408/215 |
| 852,704 | 5/1907 | Collins | 408/215 X |
| 984,577 | 2/1911 | Maglenn | 408/215 X |
| 2,052,587 | 9/1936 | Tucker | 408/215 |
| 2,718,646 | 9/1955 | McKenzie . | |
| 3,956,787 | 5/1976 | Crumpacker | 10/1 |
| 4,095,917 | 6/1978 | Wesner | 408/221 X |
| 4,201,503 | 5/1980 | Nannen | 408/215 |
| 4,346,491 | 8/1982 | Kraus et al. | 470/185 |
| 4,572,032 | 2/1986 | Kinzler | 76/101 |
| 4,630,978 | 12/1986 | Keiser et al. | 408/159 |
| 4,872,790 | 10/1989 | Sibole | 408/221 |
| 5,127,776 | 7/1992 | Glimpel | 408/220 |
| 5,288,181 | 2/1994 | Pinkston | 408/1 R |
| 5,507,608 | 4/1996 | Forslind | 470/207 X |

FOREIGN PATENT DOCUMENTS

7986/32  8/1933  Australia .

*Primary Examiner*—Daniel W. Howell
*Assistant Examiner*—Henry W. H. Tsai
*Attorney, Agent, or Firm*—Whyte Hirschboeck Dudek S.C.

[57] ABSTRACT

A thread repair tool and method of manufacturing are disclosed, along with a method for repairing damaged threads of a bolt, stud, or the like. The thread repair tool includes a pair of chaser sections each having a threaded inner diameter to match the threads of the bolt or stud to be repaired. Each chaser section has a tapered outer diameter and a longitudinal keyway in the tapered outer diameter. A driver is provided in which its inner diameter is tapered to match the outer diameter of the chaser sections. The tapered driver and chaser sections are locked together with a pair of keys, and the arrangement provides positive, force transferring engagement between the driver, the chaser sections, and the bolt or stud. The arrangement translates longitudinal pressure applied to the driver into radial pressure forcing the chaser sections tightly against the bolt or stud to be repaired. Once assembled, the thread repair tool is drawn over the damaged area of the bolt or stud and straightens the threads to restore the useability and integrity of the bolt or stud. Preferably, the threads in the chaser sections are contour milled according to the disclosed method of manufacture.

18 Claims, 3 Drawing Sheets

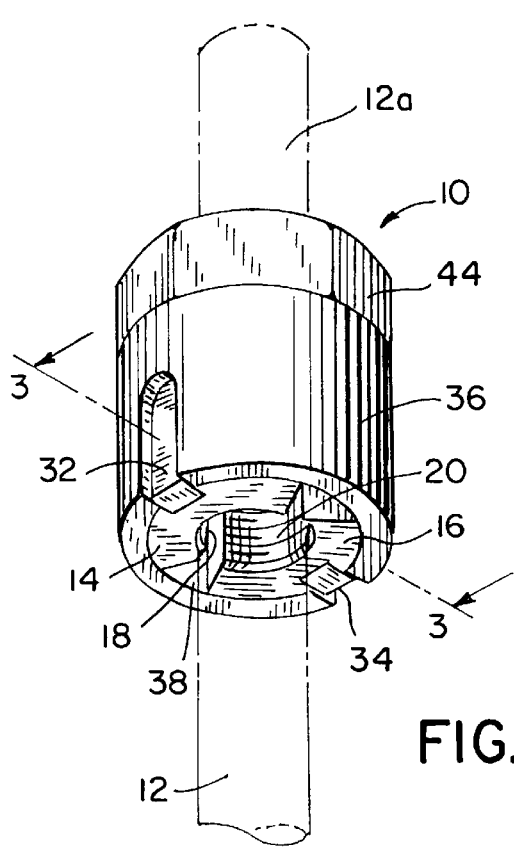
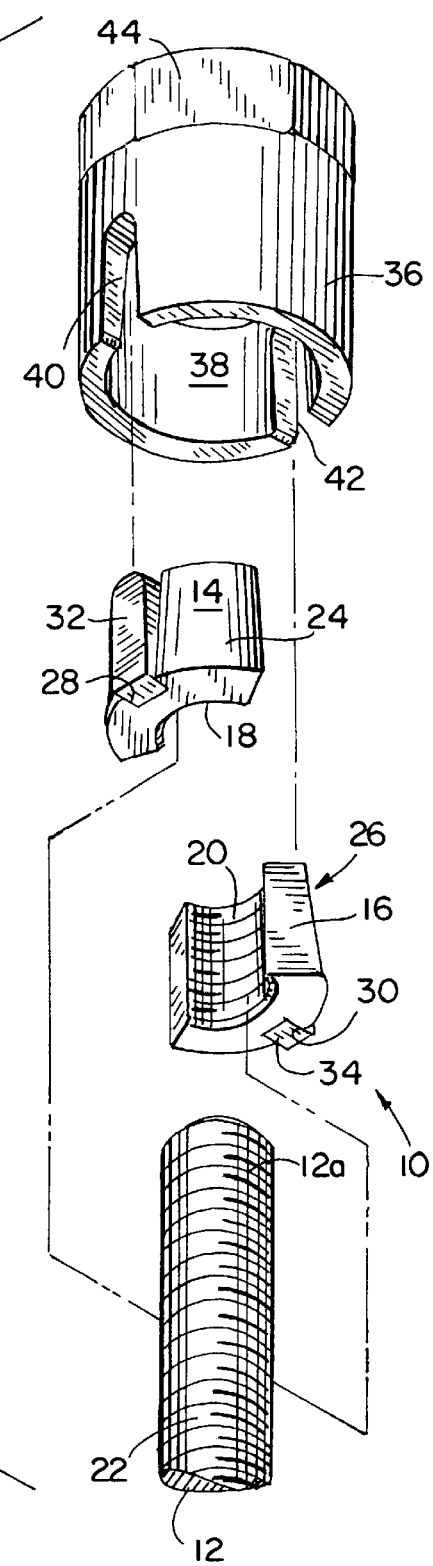
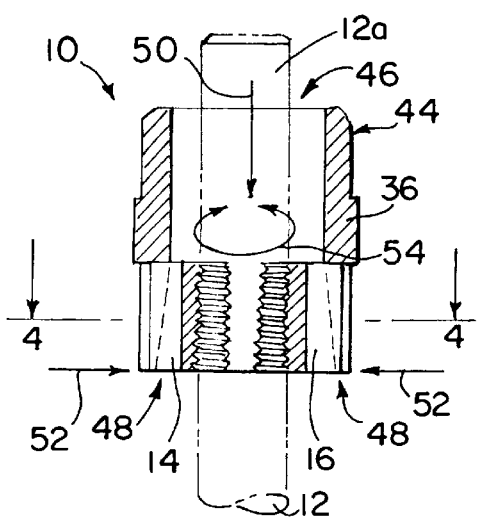

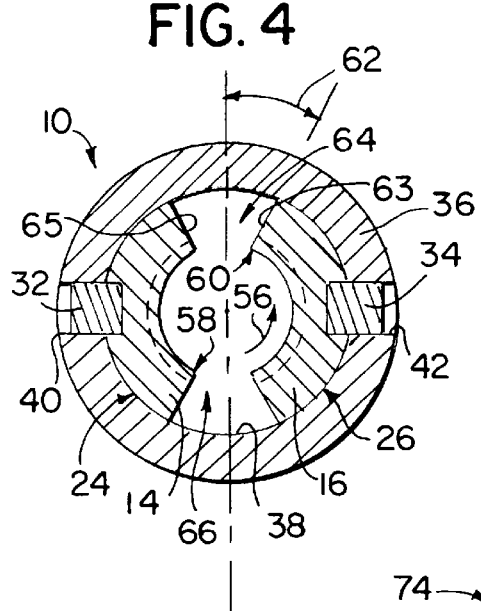
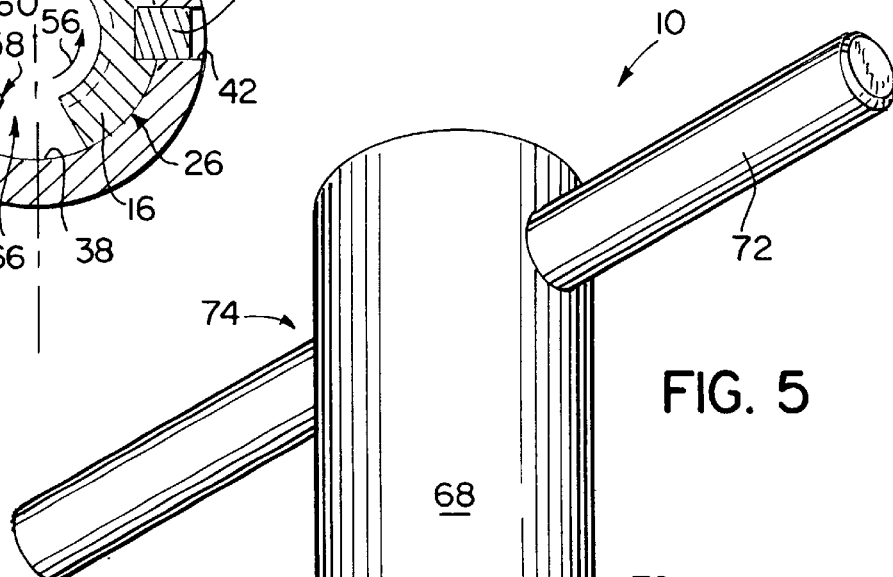
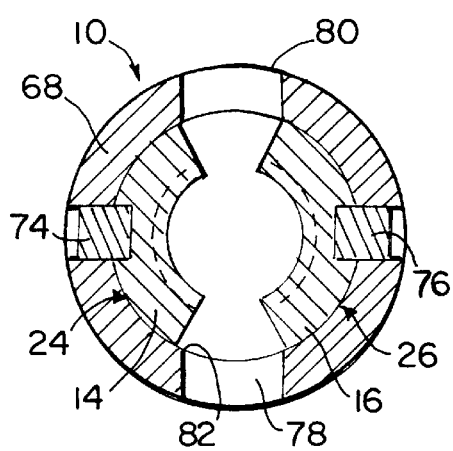
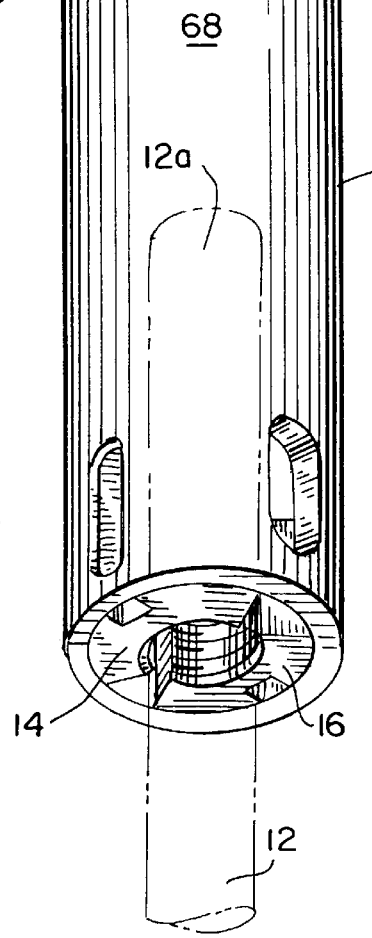

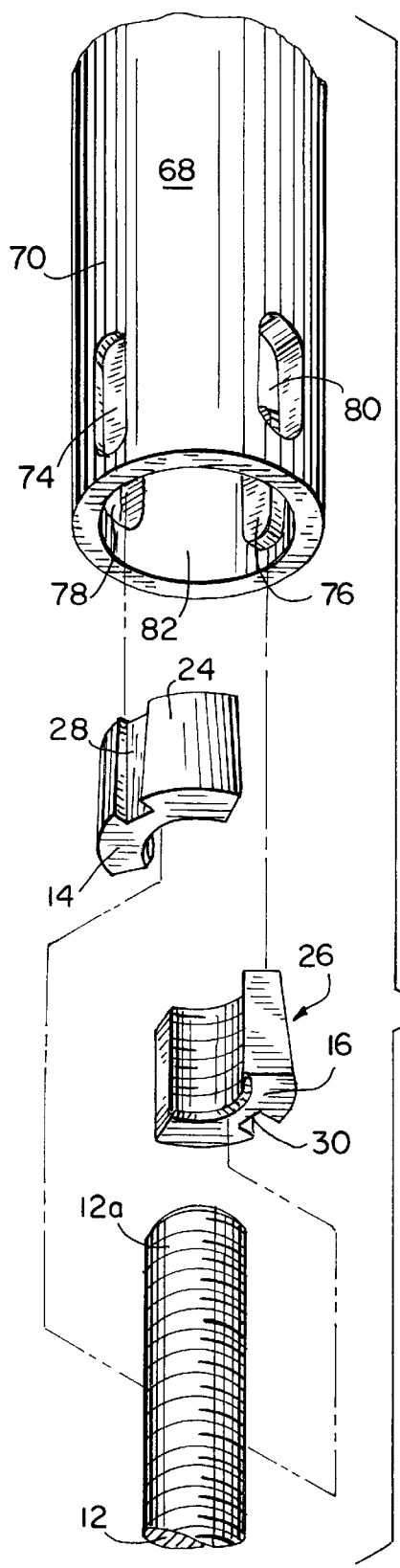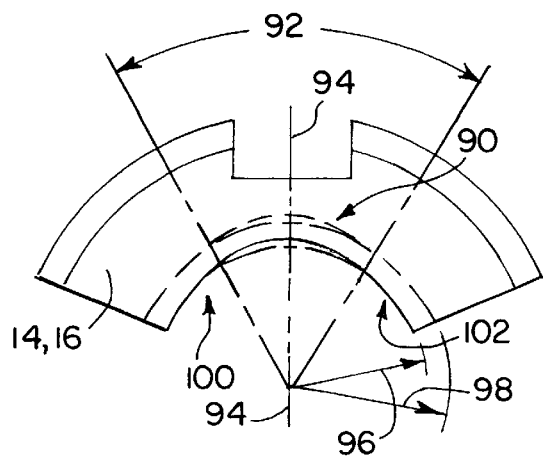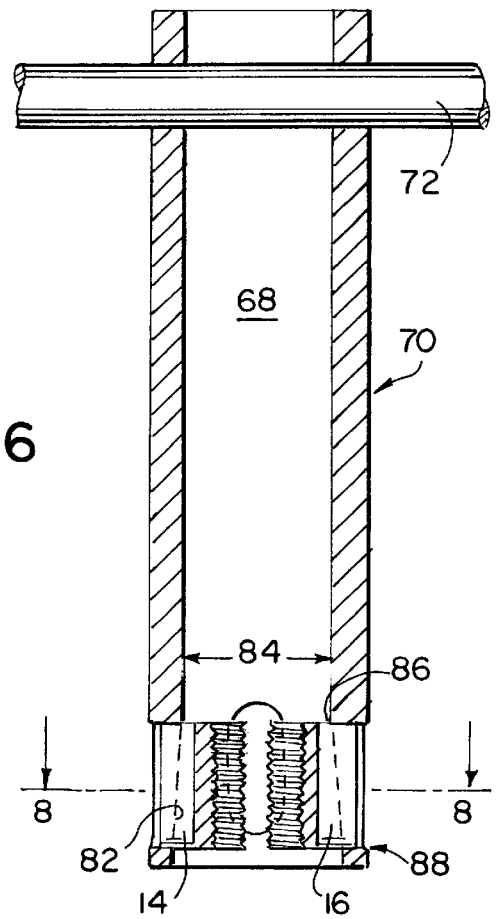

METHOD AND TOOL FOR REPAIRING DAMAGED THREADS

BACKGROUND OF THE INVENTION

The present invention relates generally to repairing damaged threads on a bolt or stud, and more particularly to a thread repair tool having a pair of chaser sections engagable with a drive tool. When the thread repair tool is assembled ahead of the damaged threads, the chaser sections can be withdrawn over the damaged threads, thereby restoring the useability and integrity of the previously damaged bolt or stud.

There are many applications in which bolts or studs get inadvertently damaged and are not easily accessible for replacement, or replacement parts are not easily attainable. For example, in the automotive industry, wheel axle studs and exhaust manifold studs are easily damaged but difficult to replace and sometimes difficult to find replacements. If the damage does not occur on the end of the bolt or stud, many times a common die can be used to clean the damaged threads. However, where the damage occurs at the starting end of the bolt or stud, the use of a die is not desirable since dies are designed for cutting threads and it is all too easy to cross thread the die on the bolt, thereby cutting new threads that do not align with the original threads. Once this happens, the bolt or stud is irretrievably damaged and must be replaced.

It would therefore be desirable to have a tool to engage the threads ahead of the damaged area and rotate the tool toward and over the damaged threads to repair the threads in such a way as to restore the integrity and useability of the bolt or stud. There have been many prior art attempts at producing such a tool, but most have failed to provide an affordable thread repair tool that is useable in tight locations, is easy to use, and restores the existing threads, as opposed to cutting new threads.

Two examples of such prior art devices are shown in U.S. Pat. No. 4,572,032 issued to Kinzler and U.S. Pat. No. 4,872,790 issued to Sibole. These references disclose split die devices which are relatively expensive to manufacture. Further, since dies are designed for cutting, they are not desirable when simply attempting to repair threads.

Other attempts have been made in U.S. Pat. No. 4,630,978 issued to Keiser et al. and U.S. Pat. No. 5,288,181 issued to Pinkston. Both Pinkston and Keiser et al. disclose devices that use dies and thread cutting teeth, which as previously described, are not desirable when simply repairing threads. Further, both references show a hinging feature, and the Keiser et al. device requires cam surfaces and biasing springs. These features require a relatively large number of manufacturing steps to produce, which results in devices too costly for common use.

Another example of a thread repair tool in the prior art is shown in U.S. Pat. No. 4,346,491 issued to Kraus et al. Although this device attempts to repair damaged threads as opposed to cutting new threads, it uses a specially designed thread on the inner surfaces of a pair of nut sections which is relatively costly to manufacture for common use. The half nut sections are also said to be substantially arcuate to form a cylinder when assembled about a bolt or stud. This leaves little room for any shavings to be discharged, or for the introduction of lubricant.

Therefore, it would be desirable to have a thread repair tool that is relatively inexpensive to manufacture and that allows the repairing of damaged threads in tightly confined areas.

SUMMARY OF THE INVENTION

The present invention overcomes the aforementioned problems, and provides a thread repair tool capable of repairing damaged threads in tight, confined areas, and that is manufacturable at relatively low costs for common use.

In accordance with one aspect of the invention, a thread repair tool to repair damaged threads on a bolt, stud, or the like is disclosed having at least two chaser sections. Each chaser section has a threaded inner diameter to match the threads of the bolt, stud, or the like to be repaired. Each of the chaser sections also has a tapered outer diameter and a longitudinal keyway in the tapered outer diameter. The thread repair tool has a driver having a tapered inner diameter to substantially match the tapered outer diameter of the chaser sections. The driver has a pair of keyway slots spaced apart to match engagement with a pair of keys that are engagable with the keyways of the chaser sections and the keyway slots of the driver. In this manner, the chaser sections are positively engaged to the driver by way of the taper and the keys.

In accordance with another aspect of the invention, a thread repair tool to repair damaged threads on a bolt or stud has at least two chaser sections each having a threaded inner diameter matching the threads of the bolt or stud to be repaired. Each chaser section has a tapered outer diameter and a longitudinal keyway in the tapered outer diameter. The thread repair tool has a driver having a tapered inner diameter substantially matching the tapered outer diameter of the chaser sections. A pair of keys are provided on the inner diameter of the driver that are spaced apart to match engagement with the keyways of the chaser sections. In this manner, the chaser sections are positively engaged to the driver by way of the taper and the keys.

The invention also includes a method of repairing damaged threads on bolts or studs which includes the steps of assembling the pair of chaser sections about an area of the bolt or stud to be repaired rearward of the damaged threads. The chaser sections have an internal thread substantially matching those of the bolt or stud to be repaired, an outer periphery tapering toward the damaged threads, and also a longitudinal keyway in the outer periphery. The method next includes the step of engaging a driver having a tapered inner diameter with the tapered outer diameters of the pair of chaser sections assembled about the bolt or stud, and locking the chaser sections to the driver with a pair of keys. Next, the method includes exerting pressure on the driver toward the larger taper of the chaser sections and simultaneously rotating the driver to draw the chaser sections over the damaged threads thereby straightening the damaged threads to provide a useable bolt or stud.

In accordance with yet another aspect of the invention, a method of manufacturing a thread chaser is disclosed. The method includes tapering a face in an outer diameter of a cylindrical section of stock or round bar to create a tapered outer diameter. The section of stock or bar is then bored and faced on the inner diameter, and then split about a center point of the inner diameter located in the hollowed center. Keyways are then milled into the tapered outer faces of each split section of stock, and the ends of the split sections are milled to provide an angle of restoration. The next step includes contour milling internal threads inside each of the split sections. The threads then have a concentric oval shape in each split section. Finally, the method preferably includes the steps of heat treating the split sections to produce a chaser harder than most bolts or studs to be repaired, and grinding the edges to provide a sharp face on the restoration edge.

One of the objects of the present invention is to provide a thread repair tool with minimal components that is economical to manufacture.

Another object of the invention is to provide a thread repair tool that repairs the damaged threads, as opposed to cutting away the damaged material which can create a thread void in the bolt or stud being repaired.

Yet another object of the present invention is to provide a thread repair tool that is compact and useable in tightly confined areas.

Still another object of the invention is to provide a thread repair tool having at least two chaser sections that are engagable with good threads rearward of the damaged threads, and having a driver capable of engaging the chaser sections and allowing a long bolt or stud to protrude therethrough. The chaser sections can then be withdrawn over the damaged threads to restore the useability and integrity of the previously damaged bolt or stud.

Various other features, objects, and advantages of the present invention will be made apparent from the following detailed description and the drawings.

BRIEF DESCRIPTION OF THE DRAWINGS

The drawings illustrate the best mode presently contemplated for carrying out the invention. In the drawings:

FIG. 1 is a perspective view of a preferred embodiment of the thread repair tool of the present invention.

FIG. 2 is an exploded perspective view of FIG. 1.

FIG. 3 is a cross-sectional view taken along line 3—3 of FIG. 1.

FIG. 4 is a cross-sectional view taken along line 4—4 of FIG. 3.

FIG. 5 is a perspective view of another embodiment of the present invention.

FIG. 6 is a partial exploded perspective view of FIG. 5.

FIG. 7 is a longitudinal cross-sectional view of FIG. 5.

FIG. 8 is a cross-sectional view taken along line 8—8 of FIG. 7.

FIG. 9 is a bottom view of a portion of FIG. 1.

DETAILED DESCRIPTION OF THE PREFERRED EMBODIMENT

FIGS. 1 and 2 show a thread repair tool 10 used to repair damaged threads 12a on a bolt, stud, or the like 12. The thread repair tool 10 has at least two chaser sections 14 and 16, each having a threaded inner diameter 18 and 20, respectively. The thread pitch and the number of threads per inch of the threaded inner diameters 18 and 20 of chaser sections 14 and 16 match the threads 22, FIG. 2, of the bolt or stud 12.

The at least two chaser sections 14 and 16 each have a tapered outer diameter 24 and 26, respectively, and longitudinal keyways 28 and 30 in the tapered outer diameters 24 and 26. A pair of keys 32 and 34 are engagable with keyways 28 and 30 of chaser sections 14 and 16.

A driver 36 is supplied for driving chaser sections 14 and 16 about the bolt or stud 12. The driver 36 has a tapered inner diameter 38 that substantially matches the tapered outer diameters 24 and 26 of the chaser sections 14 and 16 when placed about bolt or stud 12. The driver 36 also has a pair of keyway slots 40 and 42 spaced apart to match engagement with the keys 32 and 34 in keyways 28 and 30 of chaser sections 14 and 16. The driver 36 has a hexagonal upper end 44 that is drivable with a wrench or socket (not shown).

FIG. 3 shows a longitudinal cross-section of the thread repair tool 10 placed about a bolt or stud 12 taken along the line 3—3 of FIG. 1. The driver 36 has an open top end 46 to allow the protrusion of a long bolt or stud 12 to extend through thread repair tool 10. FIG. 3 illustrates how the matching tapers of chaser sections 14 and 16 substantially match the taper of the inner diameter of driver 36, as shown by arrows 48, to provide a positive, force transferring fit between driver 36 and chaser sections 14 and 16. In this manner, when a socket wrench (not shown) is placed over the hexagonal upper end 44 of driver 36, an operator can apply longitudinal pressure, as shown by arrow 50, onto driver 36 which thereby increases radial pressure from the driver 36 onto the chaser sections 14 and 16 and onto the bolt or stud 12, as shown by arrows 52.

In operation, as longitudinal pressure is maintained along arrow 50, the operator simultaneously turns the driver 36 in a direction to draw the chaser sections 14 and 16 upward on bolt or stud 12 and over the damaged threads at 12a in a direction as shown by arrow 54. As one skilled in the art will readily recognize, the inner threads of the chaser sections and the direction of rotation will depend upon whether the bolt has right-hand threads or left-hand threads. Although the longitudinal pressure along arrow 50 is desirable to maintain the tightest fit among the interacting parts and exert increased radial pressure on the bolt threads, the present design is not solely dependent upon such pressure, and will operate with minimal longitudinal pressure since the keys provide a locking relation between the driver and the chaser sections.

FIG. 4 shows a top view along line 4—4 of FIG. 3 having chaser sections 14 and 16 engaged with driver 36 by keys 32 and 34 and by the tapered inner diameter 38 engaging the tapered outer diameters 24 and 26. When the thread repair tool 10 is rotated counter-clockwise as shown by arrow 56, leading edges 58 and 60 of the chaser sections 14 and 16 perform the straightening of the damaged threads as the thread repair tool 10 is rotated over the damaged thread section of the bolt or stud 12, FIGS. 1–3.

As shown in FIG. 4, when chaser sections 14 and 16 are fit in driver 36 about a bolt or stud, preferably each of the chaser sections 14 and 16 will cover less than 50% of the circumference of the bolt or stud. The chaser sections 14 and 16 are cut at an angle of restoration 62 which forms restoration edges 63 and 65. In the preferred embodiment, the angle of restoration 62 is 30°. This is commonly referred to as a positive cutting approach, as opposed to a negative cutting approach where the cutting angle is zero or negative which results in the ripping of material. Since most bolts and studs are made of material with high tensile strength, it has been found that the use of a positive cutting approach is more advantageous in repairing damaged threads than a negative cutting approach.

Although some cutting of threads may occur with the present invention, the tool is designed to straighten the existing damaged threads and remove as little material as possible. In this manner, the integrity of the bolt or stud is maintained by eliminating any excess removal of thread material.

A further advantage to this configuration is the gaps 64 and 66 that are formed between chaser sections 14 and 16. These gaps not only provide an area for the accumulation and fallout of any cut material from the damaged bolt or stud, but more importantly allow for the introduction of lubricant during the repair process.

FIG. 5 shows an alternate embodiment of thread repair tool 10 having a T-handle driver 68. The driver 68 has a hollow cylindrical body 70 with a turning handle 72 at an upper end 74. The turning handle 72 is transversely mounted in the hollow cylindrical body 70, and may be fixed or slidable therethrough to provide additional leverage on one side, while allowing clearance on the opposite side. The thread repair tool 10 of FIG. 5 uses the same chaser sections 14 and 16 as shown in FIGS. 1–4, but are retained in driver 68 slightly differently.

As best shown in FIG. 6, the hollow cylindrical body 70 has a pair of integral keys 74 and 76 which protrude the inner diameter of the hollow cylindrical body 70 to engage the longitudinal keyways 28 and 30 of the chaser sections 14 and 16. Driver 68 has a pair of openings 78 and 80 to not only allow the discharge of any shavings that may occur from repairing bolt or stud 12, but to also allow the introduction of a lubricant. Driver 68 has a corresponding tapered inner diameter 82 to substantially match the tapered outer diameters 24 and 26 of chaser sections 14 and 16, respectively.

FIG. 7 shows a longitudinal cross-sectional view of FIG. 5 in which turning handle 72 is shown to be slidably mounted in the hollow cylindrical body 70 of driver 68. The hollow cylindrical body 70 has an inner diameter 84 that begins to taper at point 86, and tapers outwardly to its widest diameter at a lower end 88. In this manner, chaser sections 14 and 16 positively engage driver 68 at the tapered inner diameter 82 providing a tight, and wobble-free engagement between driver 68 and the chaser sections 14 and 16.

FIG. 8 shows a cross-sectional view taken along line 8—8 of FIG. 7, and is similar to that shown in FIG. 4. The integral keys 74 and 76 of the driver 68 are shown engaged with the chaser sections 14 and 16, and the tapered inner diameter 82 of the driver 68 is shown engaged with the tapered outer diameters 24 and 26. The operation is the same as that described with reference to FIG. 4.

The present invention also includes a method of manufacturing the thread chaser. The method includes tapering an outer diameter of a cylindrical section of stock or round bar to create the tapered outer diameters 24 and 26. The section of stock or bar is then bored and faced on the inner diameter, and then split about a center point located in the hollow center of the inner diameter. The keyways 28 and 30 are then milled into the tapered faces of each split section of stock, and the ends of the split sections are milled to provide the angle of restoration 62.

The method of manufacture next includes the step of contour milling internal threads inside each of the split sections. The threads then have a concentric oval shape in each split section. Finally, the method preferably includes the steps of heat treating the split sections to produce a chaser harder than most bolts or studs to be repaired, and grinding the edges to provide a sharp face on the restoration edge.

FIG. 9 shows one of the chaser sections 14, 16 preferably having contoured threads 90. The purpose of this thread configuration is to offset the effects of splitting the hollowed stock. When split, the sections have a tendency to open because the tension in the stock is relieved. This may cause the chaser section to rock on the bolt or stud to be repaired. This tendency may increase after the keyway is milled in the outer faces. It is preferable to ensure that the edges of the chaser sections are in contact with the bolt or stud, not the center. With this in mind, one skilled in the art will recognize that by thread milling a contour in the threads, this problem is resolved. The contoured threads 90 have a concentric oval shape and are cut by thread milling which not only provides the aforementioned advantages, but also saves manufacturing costs when produced in large quantities. This will eliminate the effects of the chaser sections opening up and will ensure that the ends are the points of contact. The resulting chaser is then stabile when placed about a bolt or stud and will not rock or wobble.

In practice, an undercut is milled across a central core 92 in the chaser sections 14, 16. Preferably the undercut core 92 extends approximately 60°–30° from both sides of a center line 94. The undercut is preferably 0.003 inches deep at the center line 94 and is gradually reduced until it is eliminated passed the 30° marks. It is important to note that the width of the thread itself is not varied. That is, the difference between the minor diameter thread 96, and the major diameter thread 98 remains constant. The variation is derived from a simultaneous increase in both the minor diameter thread 96 and the major diameter thread 98, resulting in the largest diameters at center line 94. This ensures that the points of contact with the bolt or stud to be repaired remain at 100 and 102. It is understood that FIG. 9 is drawn in an exaggerated fashion to demonstrate the undercut. Further, although FIG. 9 is shown with two sets of lines for the threads within the central core 92 for illustrative purposes, in practice only one exists.

In accordance with the present invention, a method of repairing damaged threads on bolts, studs, or the like is also disclosed and includes the steps of assembling the pair of chaser sections 14 and 16 about an area of the bolt or stud 12 which requires thread repair, the chaser sections being assembled rearward of the damaged threads 12a. As previously described, the chaser sections 14 and 16 have internal threads that substantially match those of the bolt or stud to be repaired. The outer periphery of the chaser sections 14 and 16 taper inwardly toward the damaged threads 12a, and have a longitudinal keyway 28 and 30 therein.

The method includes the step of engaging a driver having a tapered inner diameter with the tapered outer diameters of the pair of chaser sections assembled about the bolt or stud to be repaired, and locking the chaser sections to the driver with a pair of keys. Next, the method includes exerting pressure on the driver toward the larger taper of the chaser sections and simultaneously rotating the driver to draw the chaser sections over the damaged threads to thereby straighten the damaged threads and provide a useable bolt or stud.

It is contemplated to provide a set of chaser sections pairs, wherein each pair of chaser sections has a different inner diameter to accommodate a variety of bolt and stud sizes. In this configuration, the set of chaser section pairs would have a common outer diameter such that the entire set is useable with one driver tool. As one skilled in the art will readily recognize, the present invention can be extended for use on any type of thread, including National Course, National Fine, and metric. It is presently contemplated that a preferred single set would include 6 chaser section pairs ranging from ¼" to ⅝", for example, with a single driver. However, the sizes and the number of chasers are readily variable.

It is recognized that other equivalents, alternatives, and modifications, aside from those expressly stated, are possible and within the scope of the appending claims.

I claim:

1. A thread repair tool capable of repairing damaged threads on a threaded object comprises:

at least two chaser sections each having a threaded inner diameter, the threads matching those of the threaded object to be repaired, each chaser section having a tapered outer diameter and a longitudinal keyway in the tapered outer diameter;

a pair of keys engagable with the keyways of the chaser sections; and a driver having a tapered inner diameter substantially matching the tapered outer diameter of the chaser sections, and having a pair of keyway slots spaced apart to match engagement with the keys and keyways of the chaser sections.

2. The thread repair tool of claim 1 wherein the driver has a hexagonal upper end drivable with a wrench or socket.

3. The thread repair tool of claim 1 wherein the driver has an open top end such that a long threaded object is capable of protruding through the open top end.

4. The thread repair tool of claim 1 wherein the keys are integral in the driver.

5. The thread repair tool of claim 1 wherein the chaser sections have contoured threads.

6. The thread repair tool of claim 1 wherein the driver has a T-handle at an upper end.

7. The thread repair tool of claim 1 wherein each chaser section covers less than 50% of the threaded object when assembled about the threaded object.

8. The thread repair tool of claim 1 wherein at least one of the chaser sections has an angle of restoration of approximately 30°.

9. The thread repair tool of claim 1 further comprising a set of chaser section pairs, wherein each pair of chaser sections has a different inner diameter to accommodate a different size threaded object, and a common outer diameter.

10. The thread repair tool of claim 9 wherein a single driver is capable of engaging each pair of chaser sections in the set.

11. A method of repairing damaged threads on threaded objects, comprising the steps of:

assembling a pair of chaser sections about an area of the threaded object to be repaired rearward of the damaged threads, the chaser sections having internal threads substantially matching those of the threaded object, an outer periphery tapering toward the damaged threads, and a longitudinal keyway in the outer periphery;

engaging a driver having a tapered inner diameter with the tapered outer diameters of the pair of chaser sections assembled about the threaded object and locking the chaser section to the driver with a pair of keys;

exerting pressure on the driver toward a large taper of the chaser sections and simultaneously rotating the driver to draw the chaser sections over the damaged threads thereby straightening the damaged threads to provide a useable threaded object.

12. A thread repair tool capable of repairing damaged threads on a threaded object comprises:

at least two chaser sections each having a threaded inner diameter, the threads matching those of the threaded object to be repaired, each chaser section having a tapered outer diameter and a longitudinal keyway in the tapered outer diameter; and a driver having a tapered inner diameter substantially matching the tapered outer diameter of the chaser sections, and having a pair of keys spaced apart to match engagement with the keyways of the chaser sections.

13. The thread repair tool of claim 12 wherein the driver has an open top end such that the threaded object is capable of protruding through the open top end.

14. The thread repair tool of claim 12 wherein the driver has a T-handle at an upper end.

15. The thread repair tool of claim 12 wherein the threads of the chaser sections have a concentric oval shape.

16. The thread repair tool of claim 12 wherein the each chaser section covers less than 50% of the threaded object when assembled about the threaded object.

17. The thread repair tool of claim 12 wherein at least one of the chaser sections has an angle of restoration of approximately 30°.

18. The thread repair tool of claim 12 further comprising a set of chaser section pairs, wherein each pair of chaser sections has a different inner diameter to accommodate a different size threaded object, and a common outer diameter to accommodate a single driver to engage each pair of chaser sections in the set.

* * * * *